(12) United States Patent
Stine et al.

(10) Patent No.: US 9,760,826 B1
(45) Date of Patent: Sep. 12, 2017

(54) SHIELDED PORTAL FOR MULTI-READING RFID TAGS AFFIXED TO ARTICLES

(71) Applicant: Positek RFID, L.P., Norristown, PA (US)

(72) Inventors: Robert J. Stine, Norristown, PA (US); Herbert L. Markman, Wynnewood, PA (US); Jeffrey E. Markman, Wynnewood, PA (US)

(73) Assignee: POSITEK RFID, L.P., Norristown, PA (US)

( * ) Notice: Subject to any disclaimer, the term of this patent is extended or adjusted under 35 U.S.C. 154(b) by 590 days.

(21) Appl. No.: 13/797,368

(22) Filed: Mar. 12, 2013

Related U.S. Application Data (60) Provisional application No. 61/643,939, filed on May 8, 2012.

(51) Int. Cl.
*G06K 19/077* (2006.01)
(52) U.S. Cl.
CPC ................................ *G06K 19/07773* (2013.01)
(58) Field of Classification Search
CPC ........... G06K 19/07773; G06K 7/0008; G06K 7/10435; G06K 7/10079; G06K 19/07327; G06K 7/10445; G08B 13/2474; H01L 2924/3025
See application file for complete search history.

(56) References Cited

U.S. PATENT DOCUMENTS

| | | | |
|---|---|---|---|
| 4,182,946 A * | 1/1980 | Wayne et al. | 219/699 |
| 4,488,027 A * | 12/1984 | Dudley et al. | 219/699 |
| 4,841,692 A * | 6/1989 | Coupard et al. | 52/3 |
| 5,793,305 A * | 8/1998 | Turner et al. | 340/10.34 |
| 6,104,291 A * | 8/2000 | Beauvillier | G06K 7/0095 340/572.1 |
| 6,320,509 B1 | 11/2001 | Brady et al. | |
| 7,161,357 B2 * | 1/2007 | Lee et al. | 324/600 |
| 7,218,231 B2 * | 5/2007 | Higham | 340/572.1 |
| 7,389,938 B2 | 6/2008 | Hatakeyama et al. | |
| 7,538,675 B2 | 5/2009 | Hillegass | |
| 7,642,917 B2 | 1/2010 | Tran | |
| 7,760,093 B2 | 7/2010 | Rofougaran | |

(Continued)

FOREIGN PATENT DOCUMENTS

WO   2009002156 A1   12/2008
WO   2010097821 A1   9/2010

*Primary Examiner* — Nay Tun
(74) *Attorney, Agent, or Firm* — Duane Morris LLP (57) ABSTRACT

A shielding grounded enclosure receives containers holding articles with UHF RFID tags with codes to be read out in a multi-read operation. The container can be a cart or bag trolley carrying garments, linens, cleaning items, floor mats other RFID coded items. The enclosure forms a tunnel leading into a reading zone where antennas are mounted in the back of niches, such as the back of a transverse channel extending up the sidewalls and over the top of the tunnel. The antenna arrangement is such that illumination/polling signals are applied strongly in the reading zone. The depth of the niches and the length of hallways or foyers leading into the reading zone are dimensioned to minimize or eliminate lines of sight from the antenna to the area outside of the enclosure. Additionally or alternatively, shielding enclosure such as a conductive door is movable across an opening leading into the reading zone.

4 Claims, 8 Drawing Sheets

(56) References Cited

U.S. PATENT DOCUMENTS

| | | | |
|---|---|---|---|
| 7,830,263 B2 | 11/2010 | Fogg | |
| 7,839,276 B2* | 11/2010 | Rodgers | 340/501 |
| 7,876,220 B2 | 1/2011 | Aldridge | |
| 7,956,751 B2 | 6/2011 | Lenevez | |
| 7,986,240 B2 | 7/2011 | Rofougaran | |
| 2002/0044096 A1* | 4/2002 | Chung | G06K 7/10336 343/742 |
| 2004/0246101 A1 | 12/2004 | Cole | |
| 2006/0170556 A1* | 8/2006 | Fang | G06K 7/10336 340/572.7 |
| 2008/0048834 A1 | 2/2008 | Lenevez | |
| 2008/0272195 A1* | 11/2008 | Brod et al. | 235/438 |
| 2011/0121948 A1* | 5/2011 | Lawrence et al. | 340/10.1 |
| 2012/0019364 A1* | 1/2012 | Reichenbach et al. | 340/10.1 |
| 2012/0212327 A1* | 8/2012 | Torabi | 340/10.1 |

\* cited by examiner

SHIELDED PORTAL FOR MULTI-READING RFID TAGS AFFIXED TO ARTICLES

CROSS REFERENCE TO RELATED APPLICATION

This application claims the priority of U.S. provisional patent application Ser. 61/643,939, filed May 8, 2012.

BACKGROUND

This disclosure concerns techniques and devices for reading the identification code values of multiple radio frequency identification (RFID) tags that are present at the same time in a reading zone. A shielding enclosure confines and concentrates electromagnetic signals propagating to and from multi-read RFID tags that are present in the reading zone, while minimizing interference nulls and shadowing effects.

The RFID tags receive and respond to signals from a reading apparatus, through antennas directed into the shielding enclosure. In some arrangements, a shielding enclosure is arranged to concentrate signal strength in a limited zone for obtaining a robust response, while minimizing signal leakage from the enclosure that could result in unintended responses from RFID tags that are not located in the reading zone. In some arrangements, the shielding enclosure is structured to substantially isolate the reading zone and the antennas by electromagnetic shielding foyer structures and/or by movable shielding doors or covers that can be closed during reading. In further arrangements, the geometry of the enclosure and the orientation of the antennas are configured to provide for numerous signal paths, especially using cylindrical shapes to obtain signal propagation paths that are reflected internally to pass through the reading zone multiple times along signal propagation paths at different angles of incidence. In a reading zone bounded by cylindrical conductive walls for shielding and reflection, this effect is enhanced by tilting the antennas relative to a directly radial orientation.

RFID tags are used to affix binary codes to articles or places or persons, typically with an identifying code value that has at least a portion that is unique to the tag. The code value is associated with one or more records in a database or other data processing system and is used to access information about the tag or the articles, places or persons to which the tag is assigned. Information about the tagged article may be stored in a local inventory handling system or stored remotely and made accessible by lookup operations associated with the RFID code value or portions of the code value. Other portions of the code value may contain digits or bytes or bits that represent a description or classification or status that may not be unique. In a multi-read process, the tag code values of each tag are unique so that each tag can respond during a polling procedure in a manner that signals presence of the tag, and therefore presence of the item to which the RFID tag is attached or the person assigned to carry the tag.

RFID tags are available in different configurations, that respond to different excitation frequencies and produce responses that can be distinguished dependably at different ranges. Transceiver antennas excite or illuminate the tags and sense the response of the tag at one or more frequencies. Some RFID tag and tag code reading configurations are low powered and have a short read range. With some RFID tag and reader configurations, it is advantageous to expose only a single RFID tag to the transceiver antenna at any given time. This enables individual tag codes to be discerned without signaling collisions (namely situations where response signals from two or more tags interfere with one another). Short range RFID tags are useful in personal ID cards, in devices for authorizing single file entry to premises, for metering use of services, etc. The effective reading range or distance is small compared to the size of a person or an article bearing the tag.

In other RFID applications, the RFID tags are affixed to articles that may be in close proximity. For articles such as garments handled in cleaning processes, for example, a number of garments may be bundled or stacked in a manner that placed there RFID tags close together. One technique for discerning RFID code values on garments is to separate the tagged garments from a bundle and to toss of otherwise feed individual garments serially one after another through a chute or along a path where an RFID antenna is mounted and coupled to a controller. Stacked items such as tagged file folders, library books and finished (cleaned) garments might be separated from one another and passed in front of a reader on a conveyor, or a portable RFID reader can be passed in front of the item. Such applications are single-read operations that are possible when it is convenient to bring one tagged item into range of a reader at one time.

U.S. Pat. No. 7,876,220—Aldridge, for example, discloses a garment cleaning and tracking system. The garments are handled in batches for route collection, processing, sorting and delivery. For such applications, it is useful to have a longer reading range. It is also useful to employ a multi-read system capable of resolving collisions (contemporaneous responses) from two or more tags in a process that determines the tag code values of multiple RFID tags present at the same time. U.S. Pat. No. 7,429,912—Tanaka discloses an example of a multi-read tag technique. A transceiver apparatus has an interrogator function during which tags are polled such that tags having a particular value respond to the interrogation and other tags do not. In some systems of this type, a tag that responds (or not) can be disabled from responding again for a predetermined time, allowing other tags to be polled for other values. The code values of multiple tags that are present can be determined by collecting responses of tags at more and less significant bit positions, and disabling selected tags when a collision occurs. The interrogation by polling proceeds bit by bit through a sequence until the code values have been collected for all the tags that are within range of the transceiver. If a closed list of possible code values is known, a transceiver also can inquire for a response at each code value in turn. A system capable of discriminating the codes on plural RFID tags in range of the transceiver is generally termed a multi-read system.

A multi-read tag known as a UHF tag is currently available, operating at 860-960 MHz and having an effective read/response range between the RFID tag and the antennas that emit or receive signals up to a distance that is much larger than the tags or the articles to which the tags are attached. UHF RFID tags respond to received signals (inquiry signals) at relatively low power and emit responses (reply signals) that can be detected at long range, e.g., about 30 feet. Different frequency bands within the range of 860-960 MHz are used in different countries.

It may seem advantageous to use long range tags that operate at low power levels. But there is an operational drawback to having tags response to low power inquiry signals and emit reply signals detectable at a distance that may be larger than the size of a containment holding multi-read tags. As a practical matter, long range and limited power requirements increase the incidence of inadvertently reading RFID tag codes on articles that are not members of the group of tagged articles that are intended to be read when operating the multi-read apparatus. Such systems are prone to read tags on articles that inadvertently are within range of a transceiver, but are not members of the group of articles for which the operator intends to read the RFID codes. In an inventory control process, for example for cleaning plural articles carried in hampers, it is important not only to detect RFID code values, but also to assure, if possible, that all the articles whose code values are read are in fact located in the hamper together with the other articles whose code values are read. Without such assurance, articles thought to be in a group entering a process may actually never have been in the group. Inventory control exceptions occur, such as articles that appear to be missing when the group is checked for completeness when leaving the process.

It is not possible to rely on the tags and readers having a maximum reading distance according to a specification because the distance is only one factor among several factors affecting tag readability. High frequency signals can be transmitted and received over a direct line of sight, or the transmission path may include one or more reflections. Some surfaces reflect signals more efficiently than others. There may be interference patterns where standing waves produce maximum power peaks and minimum power nulls. As a result, the boundaries are not always well defined of the zone in which tags are being read effectively. The system designer has tradeoffs to consider. The RF excitation power level can be made high and the reception can be made sensitive, but RFID tags that are outside the reading zone may be read. The power level and reception sensitivity can be lower, but some tags inside the reading zone may not be read successfully.

In an inventory control system, an object is to account for articles that enter and exit a particular premises or process. If an RFID tag has been detected that was not a member of a group of associated articles that entered inventory, inventory assessments can be erroneous. In the case of multi-read detection of a group of RFID codes in a process involving successive groups, the erroneously detected tag may be a member of a subsequent group. It is not possible accurately to resolve the identities of articles exiting processing steps with the articles that entered those steps, if the entering article list included some article identifications that were not actually in the group.

What is needed is a multi-read system configured so that the steps of reading RFID codes on articles in a group is as sure and dependable as possible. The system should have capacity to handling a group of numerous articles, and perhaps numerous articles that are of relatively large dimensions. These objectives suggest a large reading installation applying high powered polling signals and reading from high gain receiving antennas. However, it is also important surely and dependably to eliminate reading of RFID codes on articles that are not physically in the group being handled as a unit, which suggest that the application of polling signals should be limited. A technique to resolve these objects and aspects is needed.

SUMMARY

The present disclosure provides an RFID multi-read portal containing a shielding enclosure that confines and isolates RFID tagged articles grouped for reading. The shielding enclosure has an internal reading zone in which electromagnetic signaling is accomplished between the reading apparatus and the tags via antennas that are directed into the reading zone. In different embodiments, the reading zone is isolated by a shielded foyer and/or by shielded closures on one or more sides provided for inserting tagged items or passing through tagged items, e.g., on a conveyor or in wheeled bins. An embodiment found particularly effective for reading numerous closely spaced RFID tags in garments carried in a hamper, is provided with cylindrically rounded shielding walls that define internally reflective surfaces. The antennas used for reading the tags are placed in recesses and can be mounted opposite one another in a complementary manner, and flush with the surface, or in a cylindrical arrangement mounted at an inclined angle relative to a radius.

It is an object in connection with substantially shielded enclosures to enable transmission polling signals and receiving antenna arrangements to operate at high signal transmission amplitude and high reception sensitivity when interacting with RFID tags disposed in a multi-read grouping in the reading zone. The shielding of the enclosure, including using closing covers or doors, prevents stray signals from interacting with RFID tags that are not physically found in the group, i.e., that are outside the enclosure.

According to another embodiment or category of embodiments, the shielding enclosure is provided with a structure that generally blocks line-of-sight and reflected signals from propagating in either direction between the antennas interacting with the reading zone and articles outside of the shielding enclosure. This can be accomplished by mounting the transceiver antennas in recesses and providing a shielded foyer area along aisles or passageways leading into and optionally also out of the reading zone, shielded by conductive panels functioning as skirts or fences that reduce signal leakage.

According to another embodiment or category, the shielding enclosure is equipped with movable shielding elements that are closable over one or more openings by which the articles bearing RFID tags are brought into and/or removed from the shielding enclosure. When the shielding enclosure is closed in this manner, for example using a hinged or sliding conductive door or conductive curtain, signals between the transceiver antennas and the RFID tags are confined to the zone within the enclosure. When the enclosure is substantially surrounded by conductive shielding because the movable elements are closed, the propagating signals can be maintained at high power within the closed shielded enclosure, and tags that are not within the enclosure are not erroneously read.

In one embodiment, the shielding enclosure is open at its ends to define a through passage, for example defining a reading tunnel traversed by a conveyor carrying grouped RFID tagged articles. The reading apparatus can be operated continuously to detect the RFID code values of tags passing through. In another embodiment, the shielding enclosure is provided with conductive shielding doors, e.g., on opposite sides of a passageway, and the reading operation progresses through steps of inserting a hamper or other carrier containing multiple tagged articles through open shield doors, closing the doors automatically or upon operation of a "start" switch, and then enabling a reading apparatus for sending and receiving signals during a multi-read process. The multi-read process is carried on for so long as additional RFID tags are being detected, and then after a programmable delay, the multi-read operation is construed to be done and the doors are opened to permit the hamper or carrier to be removed.

An RFID multi-read portal can be sized to accommodate relative large bins or hampers (i.e., with dimensions comparable to an aisle or hallway) or in a smaller arrangement, as an enclosure over a conveyor or the like that carries RFID tagged items or carriers therefor. The shielding enclosure defines a conductive enclosure or surround, through which a container carrying the articles is moved, such as a wheeled bin.

Advantageously, the RFID multi-read portal forms a point along a production path such that the RFID code values that are read out identify the tag-bearing articles passing a point such as a check-in point, a work-in-progress monitoring point, a shipment assembly point or another point that has a logical significance in an inventory process. The portal has a structure leading into the reading zone by which RFID tagged articles are brought into the reading zone, and optionally can have structures passing through the reading zone along an exit path. Alternatively, the same lead-in path can be used to remove the articles. On walls of the shielding enclosure encompassing the reading zone, which is spaced from the open end(s) of the lead-in structure, antenna mounting recesses are provided. The antenna mounting recesses can comprise one or more niches indented into the wall surface of the shielding enclosure. The antennas can be mounted in an arch around the reading zone, forming a tunnel. In this respect, a transverse channel is indented into the shielding enclosure along each of the opposite side walls and the upper wall (ceiling). The antennas for polling and reading the RFID tags are mounted at the backs of these channels. The floor or bottom can comprise a conductive panel.

The polling and reading antennas can be provided in complementary pairs on opposite sides of the reading zone. The antennas are arranged on mounting rails permitting vertical and/or lateral adjustment to align the antennas to the RFID tag reading zone.

The shielding enclosure walls leading up to the reading zone are elongated by a distance that complements the extent to which the antennas are set back into the channels in the shielding enclosure wall. The effect is to concentrate signal pathways near the center of the reading zone. According to one aspect, direct line-of-sight signal pathways are minimized or avoided, between the antennas in the recesses and locations outside the shielding enclosure where RFID tagged articles might be placed in a queue for reading. According to another aspect, indirect signal pathways by which signals reflecting back and forth from the sides of conductive enclosure must reflect numerous times to propagate in either direction between the antennas and RFID tags outside of the enclosure. Paths to and from these "outside" RFID tags are generally of a length that is long compared to the nominal reception and response range of the antenna, tag and reader configuration, thus attenuating the signal strength of polling and response signals with outside tags.

The optimal length of the shielded aisle or pathway leading into the reading zone (and optionally also out of the reading zone), sometimes termed a shielded foyer in this description, depends on its structure. A shielded closure such as a door, or an indirect curving or angled path may achieve the same isolation of outside tags as a long straight structure.

In general, the object is to optimize a grounded shielding enclosure around a high powered or highly focused reading zone, to receive and read codes on multiple items bearing UHF RFID tags carried in containers or along a conveyor. In one example the container is a conveyance comprising a nonconductive (RF transparent) bin such as a cart or tram carrying items to be cleaned such as garments, linens, cleaning items, floor mats or the like. The enclosure is conductively shielded to permit extensively focused and/or high powered RF communications with the RFID tags within a reading zone defined by the shielding, while substantially blocking lines of electromagnetic signal propagation that could produce detectable responses from tags that are not located within the enclosure.

According to another embodiment, the shielding enclosure is provided with conductive panels or sheets that can be rigid or flexible and are mounted in a manner that movably closes and occupies the openings by which articles are brought into or removed from the enclosure. In still another embodiment, the shielding and isolation structures applied as described are reduced to the scale of a conveyor arrangement. For the conveyor arrangement, the reading zone is defined by a tunnel within a structure bridging over a zone along the conveyor; the antennas are indented or emerge flush with the inside conductive shielding surfaces side and top walls; and the isolating foyer arrangements are defined by laterally spaced vertically extending shielding fences or skirts leading into and out of the reading zone.

BRIEF DESCRIPTION

There are shown in the drawings embodiments that are presently preferred, it being understood that the subject matter is not limited only to the arrangements and configurations shown as examples. In the drawings.

FIGS. 13-15 illustrate a rectilinear tunnel conveyor embodiment.

DETAILED DESCRIPTION

According to a variety of exemplary embodiments shown herein, the ability of multi-read RFID tagging systems is arranged so as to concentrate the transmission and reception energy in a confined reading zone of a multi-read RFID tag reading system, while also isolating the emission and reception of stray signals that may cause RFID tags outside of the reading zone to be read.

A variety of RFID controller and antenna devices are known in the art to read UHF RFID multi-read tags. Examples of tags that can be readily attached to articles such as textile articles subject to inventory control in a repetitive cleaning operation are the WT-A522 UHF tag from Fujitsu or the Midtrak T640E03 UHF tag from Tagsys RFID. Such tags are relatively small in dimension (as appropriate for attachment in hems or seams of textile articles), and therefore are perhaps more challenging than larger tags. These are durably packaged with RFID chips that can stand up to repeated washing and other processes. The tags have with associated dipole antennas, and can be sewn into a hem or the like so as to be physically attached to articles subject to inventory control. The tags can be applied to various articles including, for example, uniforms, linens, floor mats, cleaning implements and other things. The articles can be monitored for usage, issued to users and later collected for cleaning or other refurbishing, and generally managed using inventory control software.

Inventory control systems are characterized by check-in and check-out processing steps at which the RFID tag codes are read in connection with noting the presence or passage of the tag bearing articles. The RFID tags are responsive to tag reading signals from antennas operated by the controller or a reading system that can poll tags to respond selectively and to switch off for a time after responding such that signaling can be carried on with other tags.

UHF RFID Tag reading systems and antennas are currently available from Impinj and from Motorola. Antenna arrangements are available from Laird Technologies. The present disclosure is directed to optimizing the nature and configuration of portals that admit the tag-bearing articles where their RFID codes are read using transponders that have antennas coupled to the tag reading system.

Aspects of the present disclosure are applicable to various tag reading systems and suppliers but are explained herein with reference to UHF RFID tags that are presented in a group wherein numerous RFID tagged articles are to be read in a group, and other groups or other tags may be in the general premises but are not associated with the group being read at the time. The reading portals disclosed herein have aspects that are useful to isolate the group of tags being read using electromagnetic shielding techniques. Isolation in this way has the dual advantages of enabling transponder signals to be emitted at high power and received with high reception sensitivity, while also reducing the probability that a tag that is not in the group of articles that is actually in the reading portal and whose RFID code values are to be detected.

Figure 1:
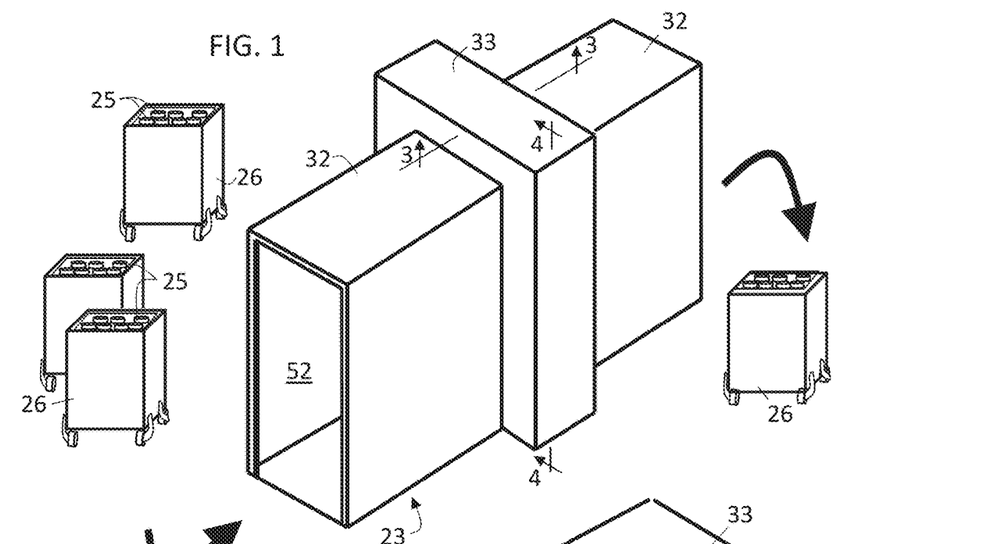
FIG. 1 is a perspective illustration showing a shielding enclosure according to an exemplary embodiment of this disclosure, wherein the articles can pass through the enclosure and the reading zone therein.

As shown in FIG. 1, a shielding structure 23 comprises an electromagnetic shield around a reading zone (within the structure 23), though which groups of articles 25 bearing RFID tags are passed for reading their RFID tag codes in a multi-read process that occurs in the shielded reading zone. By shielding the reading zone, highly focused and high powered signals for polling the RFID tags and discerning their codes is accomplished without also emitting undue stray signal levels that result in responses being generated and received from RFID tags on articles that are not located outside the reading zone at the time, for example tags in the next container or subsequent container in a queue of containers 26 awaiting the automated capture of their associated RFID code values. Inasmuch as the articles in a container 26 are processed as a batch, it is advantageous to keep an accurate association of articles and their groupings for purposes of inventory control, accounting and the like, which are complicated if it becomes necessary to deal with an unaccountable stray article code.

In FIG. 1, the shielding structure or enclosure defines a path along an elongated hallway or foyer portion leading into a reading zone within the portal. As shown by arrows, the path leads through the enclosure. The enclosure includes a reading zone that is spaced from the inlet and outlet openings. In this embodiment, hallway extensions or foyer portions 32 form shielded tunnels that lead into and away from a central zone 33. An array of transponder antennas (not shown in FIG. 1) is directed inwardly at the central zone 33 to apply electromagnetic energy for polling the RFID tags attached to articles 25 in containers 26.

The containers 26, which may contain numerous multi-read RFID tagged articles, are wheeled or otherwise conveyed into the central zone 33 one at a time. The tags on the articles 25 are subjected to a multi-read polling and response process by which the RFID code values on the RFID tags are collected. In the example shown, the containers 26 for the articles have caster wheels by which the containers are moved about over the floor. It is also possible to have a rail system along the floor for guiding the containers 26, or an overhead rail from which containers are suspended and moved through the enclosure 23. In other embodiments discussed below, the reading zone may be a point along a belt conveyor or the like. The pathway may be selectively closed off by movable shielding doors or other closures during the tag reading process.

Advantageously, articles bearing the tags are not metallic. The containers for the articles can have bodies of materials that are substantially RF transparent such as plastic or cloth. In any case, the RFID tags are exposed to the transceiver antenna array, while avoiding reflection of RF signals along lines of sight that are oriented along the hallway defined by the foyer portions 32 and that might encounter an RFID tag that is not associated with the group of articles 25 carried in the container 26 that is currently being multi-read processed.

The pathways of signals propagating in either direction between the transponder antennas and the RFID tags can be complex and varied. Among other variations, the signals can reflect from the conductive surfaces facing the inside of the reading zone. The signals diverge to some extent. The signals can reflect repeatedly, e.g., from opposite conductive surfaces or in zigzag paths. Insofar as periodic RF carrier signals are produced, standing waves and positive and negative peaks and nulls may occur. It is possible to cause the container holding the articles to move during the reading process or to cause the orientation of the transponder antennas to move during the reading process so that those nulls that are produced do not prevent particular RFID tags from responding effectively. According to the present embodiments, the portal is arranged to shield the reading zone so that transmit power and receive sensitivity can be high. Additionally, provisions are made to maximize the variations of the signal paths that intersect the reading zone where the RFID tags are located during reading.

Figure 2:
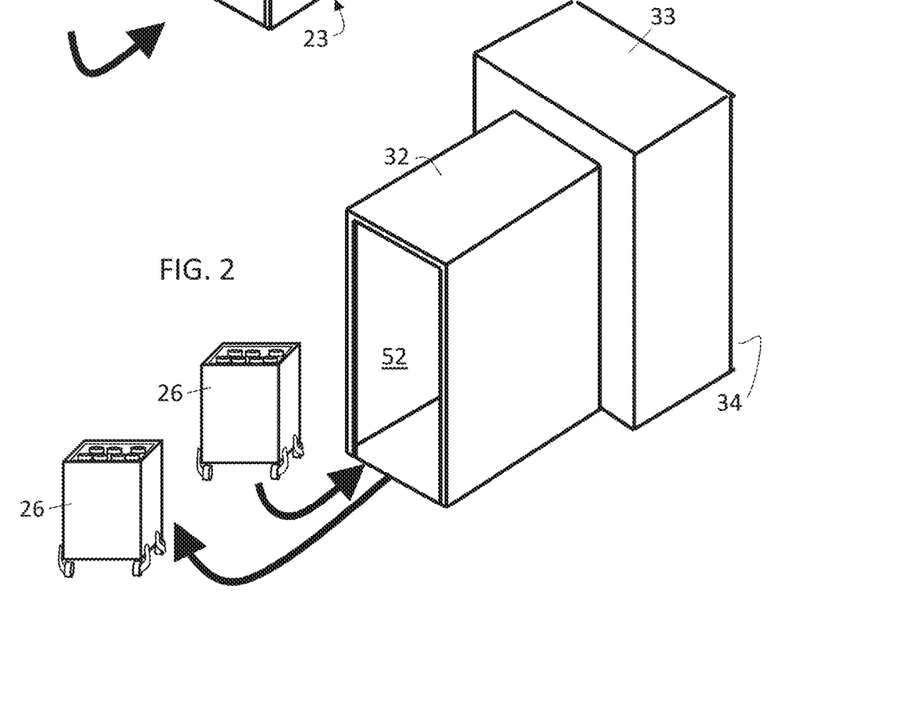
FIG. 2 is a perspective illustration of an alternative embodiment wherein the articles are moved in for reading and moved back in the opposite direction to reverse direction.

FIG. 2 shows a one-sided embodiment in which containers 26 are received through foyer portion 32, moved in one direction up to the central reading zone 33 for reading, and pulled back out again in the opposite direction, instead of passing straight through. In this embodiment, the read side 34 of the reading zone 33 can be obstructed by shielding material (not shown). It is of course possible to use the embodiment of FIG. 1 in the same way, i.e., not to use one of the foyer/hallway parts and instead to move containers 26 in and out in opposite directions.

The walls of the foyer parts 32 and central zone 33 are made of a conductive material so as to shield against through-propagation of electromagnetic energy at the operational frequencies of the RFID tags and the transceiver antennas that poll the tags. The embodiment shown is surfaced at least on one side with continuous sheet metal that can be grounded. The sheet metal can form the structural support for the enclosure. Alternatively, a thin sheet metal or foil can be affixed to a structure that is otherwise self-supporting, such as one constructed of wood studs. It is also possible to use a less continuous conductive material as the shielding material, such as a metal mesh material with openings that are small relative to the range of electromagnetic wavelengths being shielded.

Figure 3:
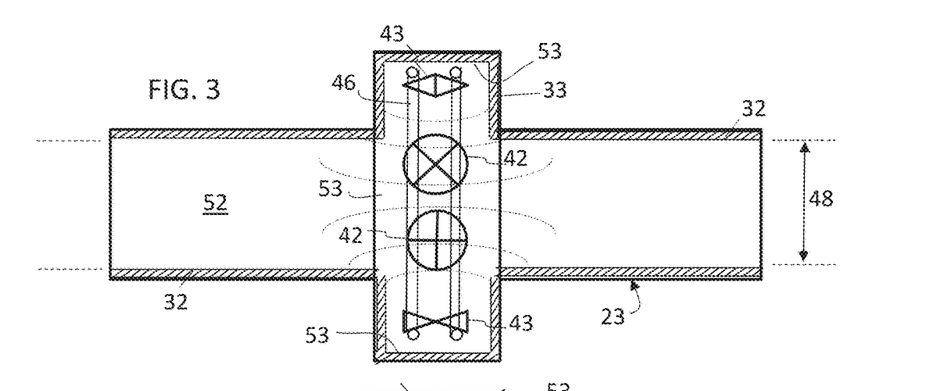
FIG. 3 is a sectional top plan view along section line 3-3 in FIG. 1, schematically showing exemplary antenna arrangements encompassing a reading zone.
Figure 4:
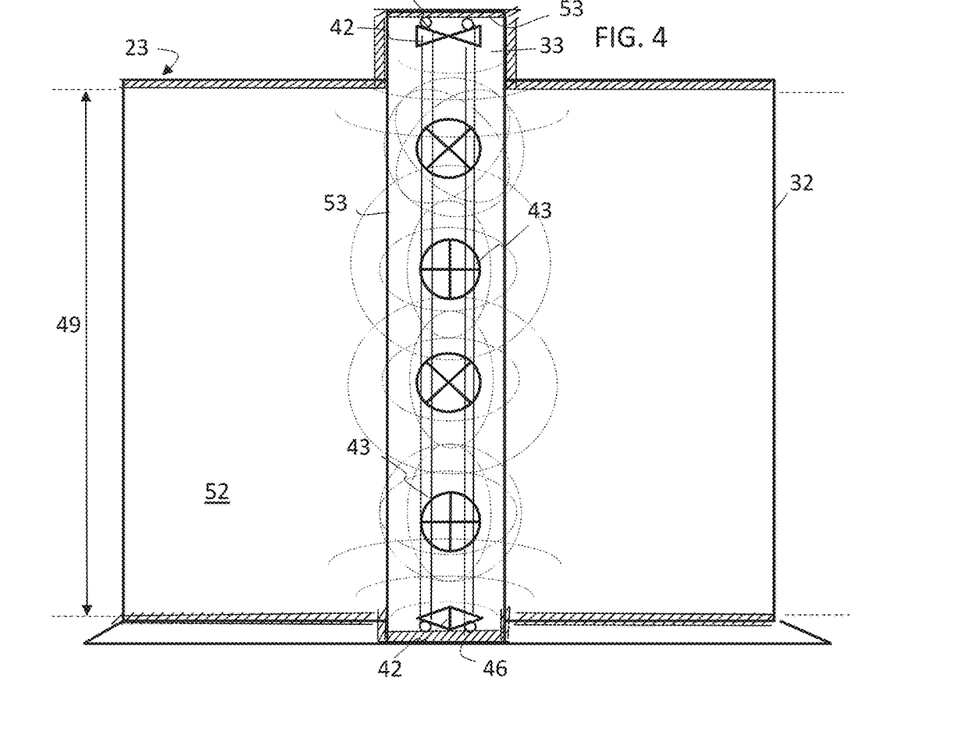
FIG. 4 is a sectional elevation view corresponding to FIG. 3, taken along line 4-4 in FIG. 1.

FIGS. 3 and 4 are schematic sectional views along lines 3-3 and 4-4 in FIG. 1, showing antenna arrays on the inside of the enclosure. Antennas 42 are mounted on the upper and optionally also lower walls and antennas 43 are mounted along the side walls of the enclosure and are configured to direct a concentrated beam onto articles in the reading zone (not shown in FIGS. 3, 4) and to likewise pick up responsive signals from the RFID tags on the articles. The antennas 42, 43 can be arranged in complementary pairs, for example in alternating order or arranged directly across from one another on surfaces surrounding the central reading zone.

Antennas are available with particular emission and reception characteristics and sensitivities. Antennas may have more or less divergent beams. The antennas may have different beam orientations and polarization characteristics. Likewise, a given antenna arrangement might be coupled to transmission and reception amplifiers with different levels of output power and input sensitivity. It is an aspect of the present disclosure to provide for beam characteristics that are highly varied as to orientation and beam path, especially by providing for transmission and reception beam paths to pass repeatedly through the reading zone along lines with different orientation, using reflections from the inner walls of the portal structure bounding the reading zone.

It is another aspect that the reading zone is electromagnetically confined within electromagnetic shielding that more or less completely encompasses the reading zone in different embodiments. In the case of a complete or relatively complete shielding enclosure, the transmission power levels applied to the RFID tags in the reading zone and the reception sensitivity levels for return signals can be adjusted to high amplitude levels, without producing sufficient signal amplitude outside the reading zone to cause RFID tags that are actually outside of the zone to respond to polling signals and to be read erroneously as included in a group of tags that actually are in the zone.

The shielding bounding the reading zone is preferably continuously smooth and reflective at the UHF frequencies of interest.

Referring to FIGS. 3 and 4, the antennas 42, 43 of the array enable transmission of polling signals and receiving antenna arrangements operable at high amplitude and high gain to interact with RFID tags disposed in a multi-read grouping. The antennas can be mounted along rails 46, for example by attachment to the rails using clamps or set screws, at an adjustable height and spacing that maximizes the exposure of the RFID tags on the articles to the electromagnetic beams of the antennas.

It is an aspect of the invention that the signals emitted and received by the antenna arrays are concentrated at the reading zone as opposed to readily propagating along lines that could activate and elicit responses from RFID tags on articles that are not physically found in the group that is currently being read in the reading zone. This is achieved in part by highly focused coupling of the polling and receiving transceiver antennas to the RFID tag reading zone, and in part by establishing a shielding enclosure 23 configured and dimensioned substantially to block line-of-sight and reflected signals from propagating in either direction between the antennas interacting with the reading zone and articles outside of the shielding enclosure.

The shielding enclosure comprises a conductive tunnel 52 through which containers 26 carrying RFID tagged articles are moved. Additionally, on the side walls and over the top of the shielding enclosure in the area encompassing the reading zone, antenna mounting recesses are provided so as to locate the antennas behind the inner plane of the surfaces defining the tunnel opening, i.e., beyond the spaces 48 and 49 defining the open volume of tunnel 52. One or more niches 53 are indented into the wall surfaces of the shielding enclosure. In the embodiments illustrated in FIGS. 3, 4, a transverse channel is indented into the shielding enclosure wall. The niches 53 are defined by channels formed in the side walls and ceiling of the shielding enclosure 23. The antennas 42, 43 for polling the RFID tags and receiving signals from which the RFID tag codes are discerned, are set back in the channels or niches 53, which placement of the antennas concentrates antenna power at the reading zone. In some embodiments (e.g., see FIGS. 13-15), the niches in which the antennas are disposed are lined with conductive material that is flush with conductive walls defining the reading zone. The antennas emit and receive electromagnetic signals through openings in the flush conductive walls, which openings are limited to the size of the antennas. In FIGS. 3 and 4, the antennas are set back to the rear of the channels/niches 53, which similarly defines a narrow signal path and concentrates available transmit and receive energy in the central area of the reading zone.

Figure 5:
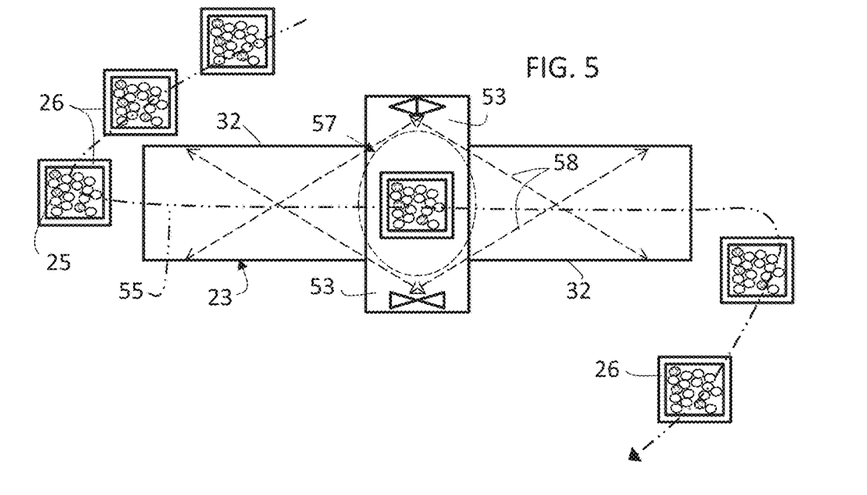
FIG. 5 is a plan view schematically illustrating a container path and showing line of sight limitations from antennas recessed in shielded channels, through shielding foyers, toward entrance and exit openings.
Figure 6:
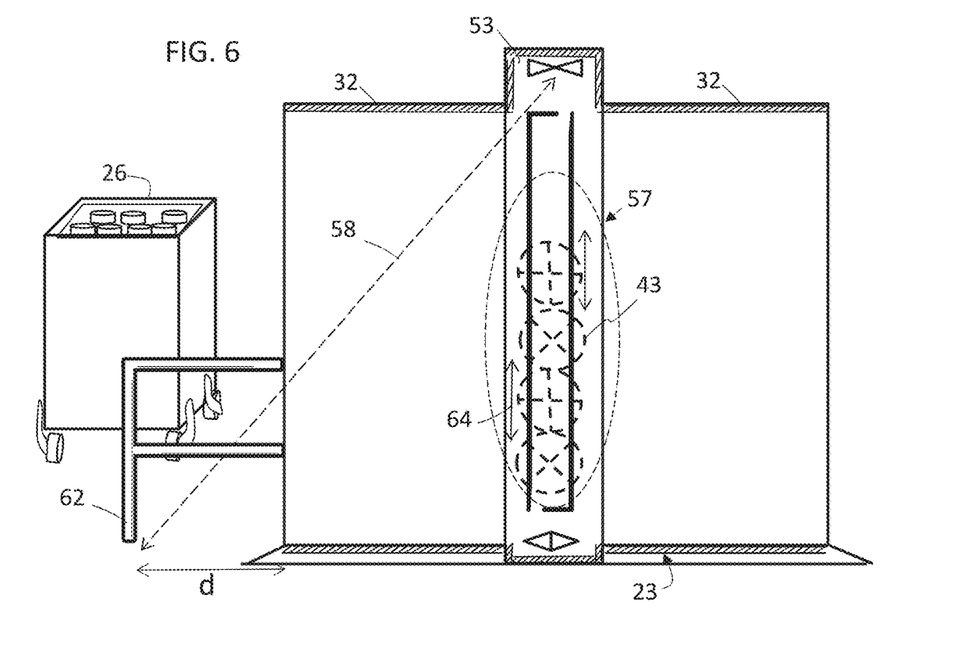
FIG. 6 is an elevation view schematically illustrating an embodiment wherein the lines of sight are substantially but not completely obstructed, and further comprising arrangements to define a container path.

Referring to FIGS. 5 and 6, the portal structure including the reading zone 57 and the shielded tunnels 32 (sometimes termed hallways or foyers) is dimensioned for wheeled bins or hampers as the containers 26 holding the articles moved along path 55 into the reading zone 57 to which the antennas are directed. Thus, the portal apparatus as a whole forms a pathway or aisle that is large enough for a person to walk through, when inserting or pushing through a container 26 containing RFID tagged articles. The walls of the shielding along the hallway or foyer portions 32 leading up to the reading zone 57 can be elongated by a distance that complements the extent to which the antennas are set back into the channels or niches 53 in the shielding enclosure wall, so as to eliminate direct lines of sight to the outside. In that case and as shown in FIG. 5, the depth of the channels or niches 53 is such that a line of sight 58 from an antenna at the edge of the niche 53 intersects the wall of the hallway or foyer 32 at a distance from its opening to the outside.

Referring to FIG. 6, it is possible to have lines of sight 58 that are minimized as opposed to being wholly obstructed as in FIG. 5. In FIG. 6, a line of sight from the back of niche 53 reaches an outside point at a distance d from the opening. Advantageously, provisions are made to keep containers 26 out of the area where their tags might be read. In FIG. 6, a barrier 62 is arranged such that the containers being moved up to approach the enclosure 23 need to pass around at a distance beyond distance d. In this way, direct lines of sight are reduced or eliminated between the antennas in the recesses 53 and locations outside the shielding enclosure where RFID tagged articles might be placed in a queue for reading.

Insofar as a transmission or reception beam path may include transmission/reception beam legs that reflect from the opposite walls surrounding the reading zone or along the foyer portions 32, the beam may pass back and forth in a zigzag pattern between the reading zone 57 and the outside area beyond the openings of the shielding hallway or foyer structures 32. With relatively longer distance between the outer openings of the hallway/foyer structure 32 and the reading zone, there are more instances of reflection, and the total transmission or reception path length is longer than where a beam might be oriented longitudinally through the hallway/foyer tunnels 32. With a sufficient number of zigzag passes, the total beam length may approach or exceed the reading range applicable to the RFID tags, thereby isolating from interaction with the reading apparatus any RFID tags located outside of the portal structure.

The shielding effect of the enclosure 23 can be enhanced by including inwardly protruding conductive material to wholly or partly block the cross section of the hallway/foyer structures 32 at one or more points between the reading zone and the outside. Such shielding (not shown in FIGS. 5 and 6) can be at the extreme input (or exit) openings or between such openings and the antenna niche channel. Inwardly protruding conductive flanges, conductive curtains, movable conductive doors or the like can be employed. Also, the particular positions of the antenna can be adjustable over a span 64 for maximizing visibility of RFID tags in reading zone while minimizing or defeating interaction with RFID tags that are located elsewhere.

In general, one object is to optimize a grounded shielding enclosure 23 around a high powered or highly focused reading zone 57, to receive and read codes on multiple items 25 bearing UHF RFID tags, e.g., carried in containers 26. In one example the container is a conveyance comprising a nonconductive (RF transparent) bin, such as a cart or tram carrying items to be cleaned, such as garments, linens, cleaning items, floor mats or the like. The enclosure is conductively shielded to permit extensively focused and/or high powered RF communications with the RFID tags within a discrete reading zone, while substantially blocking lines 58 of electromagnetic signal propagation that could produce detectable responses from tags that are not located within the enclosure.

In the illustrated embodiments, the enclosure 23 generally defines a downwardly open channel or tunnel elongated along the path of containers for the articles. The niches 53 are formed as a downwardly opening tunnel that is elongated transverse to the container path and surrounds reading zone 57, i.e., elongated vertically along the sidewalls and horizontally over at least the top and potentially also the bottom of the enclosure 23. The enclosure, including the niche and hallway or foyer forming tunnels, comprises electromagnetic shielding material such as sheet metal, conductive polymer, screen or wire mesh, all preferably grounded.

Figure 7:
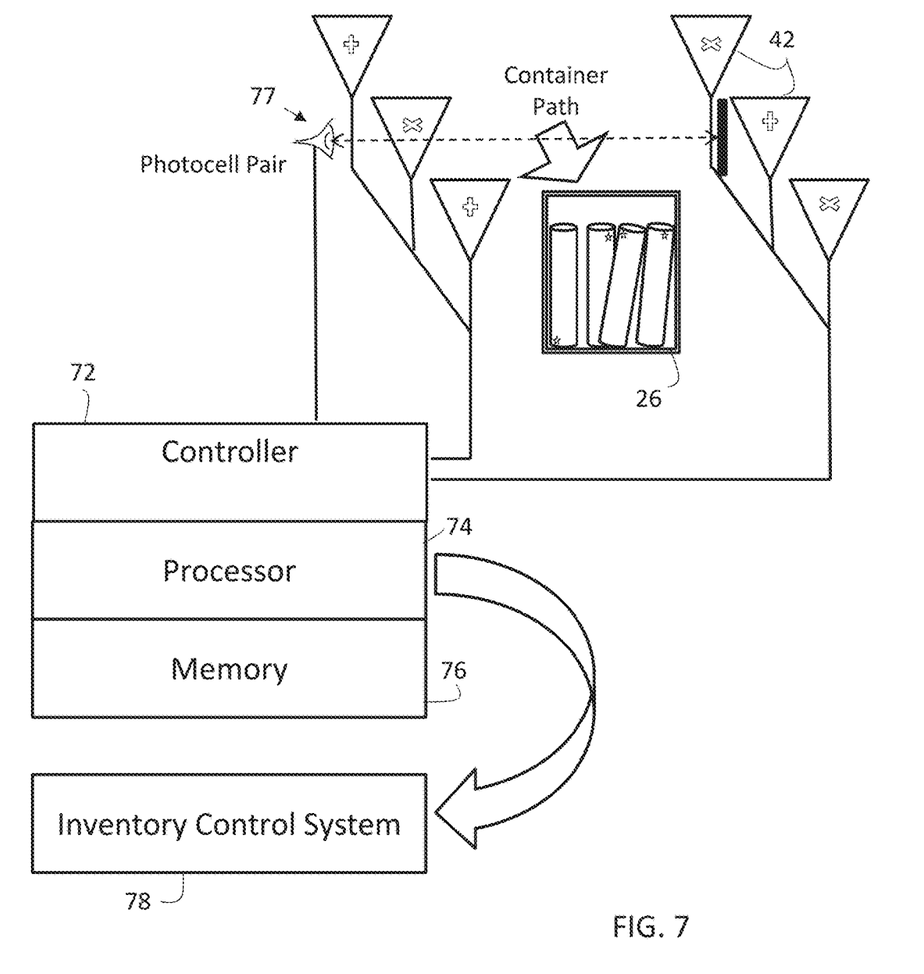
FIG. 7 is a schematic showing data and signaling relationships.

In FIG. 7, the antennas 42, 43 are operated by a controller 72 for polling RFID tags in a multi-read process, for discerning the codes of the tags on articles in the containers 26 from the tags' responses to polling signals. Under control of a programmed processor 74 coupled to a memory 76, the tags are polled and their codes are read and stored. The reading operation can be commenced automatically upon detecting the presence of a container 26 in the reading zone, for example using a photocell pair 77, limit switch input of other trigger. The data is used, for example, to count, identify, check-in, check-out or otherwise confirm the presence of identified articles and their presence at a particular point in a process managed by an inventory control system 78.

RFID reading apparatus may have the option to adjust the power level of electromagnetic signals emitted into the read zone and the sensitivity of reception. Conventionally, engineers seek to adjust the power level and sensitivity so as to be sufficient for reading RFID tags at a limited distance only, such as a foot or 20 inches, thereby reducing the incidence or inadvertent reading of a tag that is not associated with a particular group of articles. Proceeding in that way keeps power levels low and reading zones small. According to the present technique comprising concentrating RF energy and isolating the reading zone by shielding, a higher power level is possible, up or exceeding regulatory limits that are intended to prevent interference with other devices, because the reading zone is isolated and shielded. The shielding permits transmission power levels and reception sensitivity to be nominal for reading at several feet, which is advantageous for reading RFID tags in bins or hampers of a comparable size.

Figures 8A, 8B, 8C:
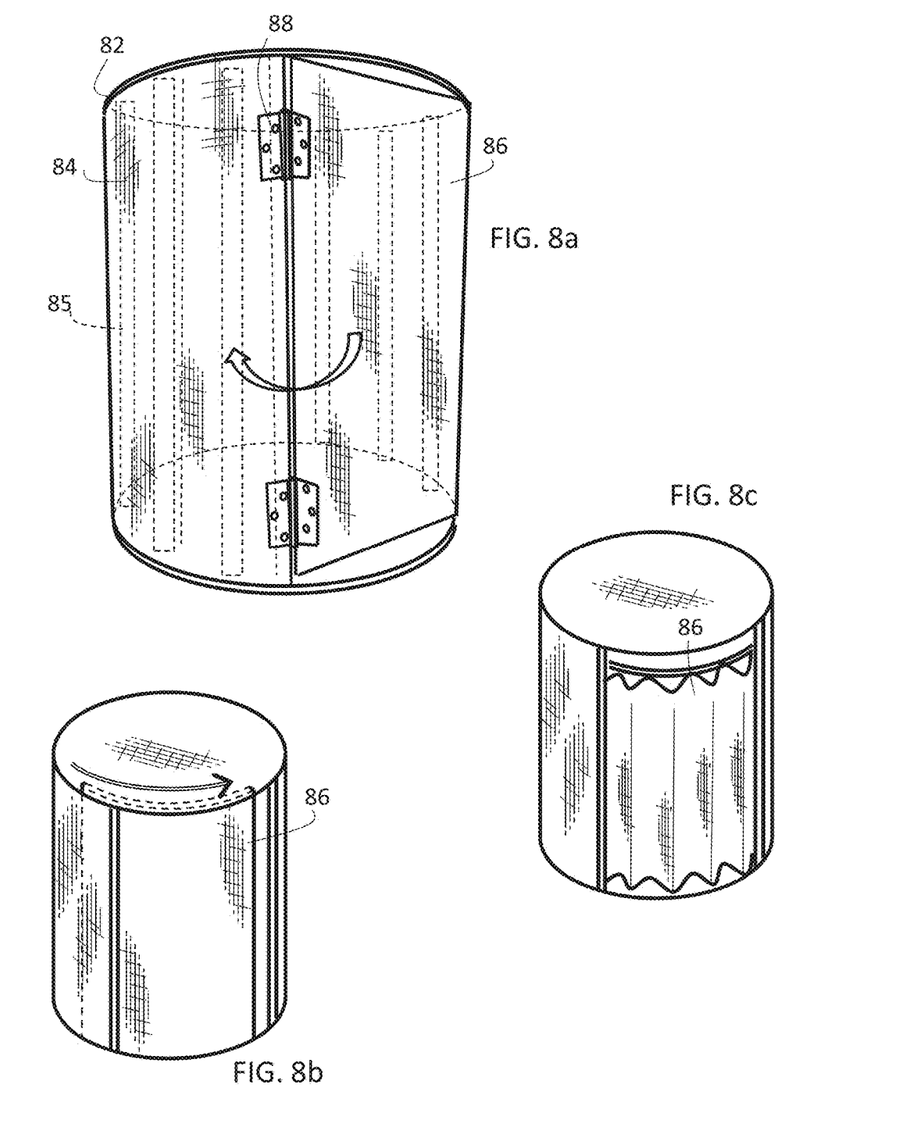
FIGS. 8a, 8b and 8c illustrate embodiments wherein the shield enclosure defines a cylinder. These embodiments further comprise a movable shielding closure.

The electromagnetic signal for reading tags can be applied only when enabled by a manual switch input, or automatically when detecting a bin or an article in the read zone. In some embodiments, the read zone is selectively isolated by shielding closures. In embodiments shown in FIGS. 8a-8c, a shielding enclosure 82 is structured as a booth with movable shielding, instead of a read zone isolated by walk-through shielding tunnels. A closure 86 is movable as shown to open or close a path by which articles (not shown) can be moved into the enclosure 82. In these embodiments, the shielding material 84 of the portal and/or the movable shielding closure can comprise a conductive material such sheet metal, conductive polymer, screen or mesh, etc., mounted to wrap completely around an internal area surrounded by structural members 85, extending between ceiling and floor planes that are preferably shielded as well. In FIG. 8a, the closure 86 comprises a door panel movable around a vertical axis on hinges 88. In FIG. 8b, the closure 86 comprises a sliding door. In FIG. 8c, the closure 86 has a conductive curtain. In each case the closure 86 is electrically coupled to the conductive enclosure so as to define an effective electromagnetic shield.

Figure 9:
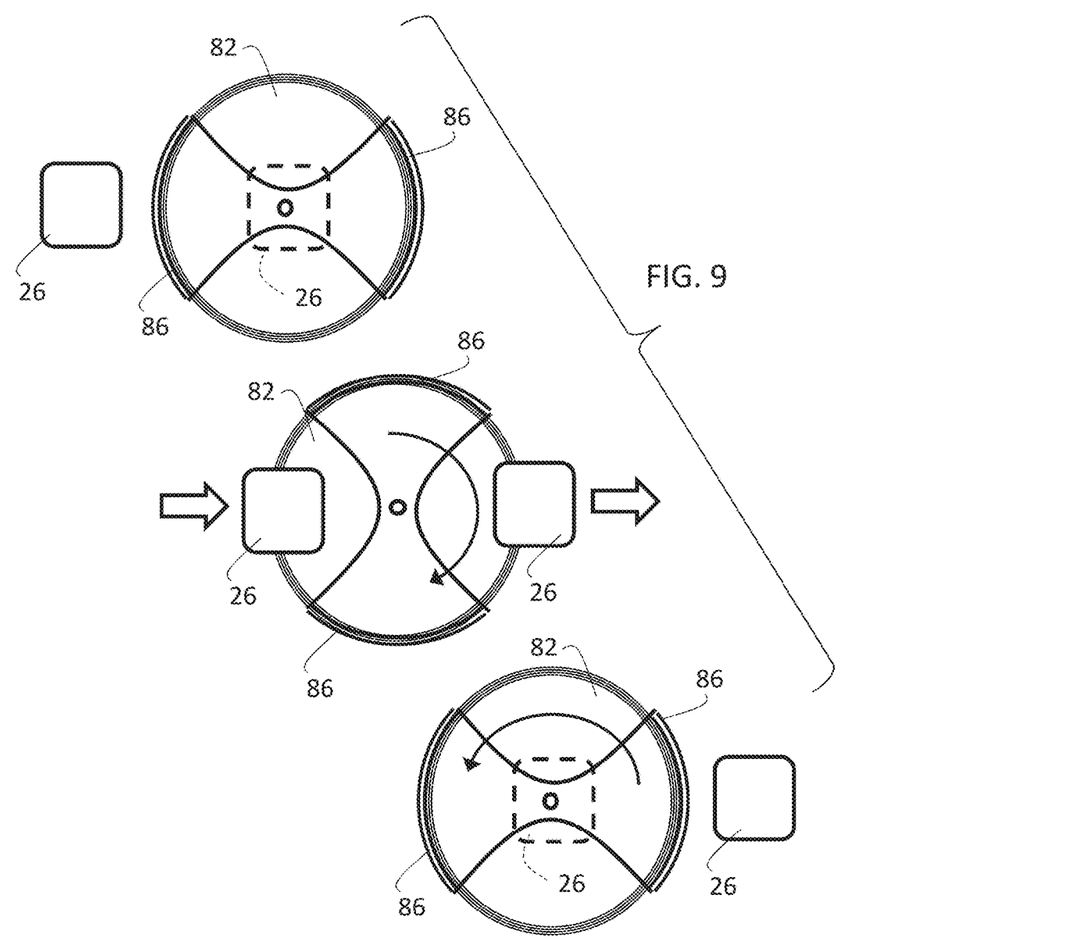
FIG. 9 is a plan view showing a shielded cylindrical reading portal with opposite shield doors mounted as a unit for simultaneously opening and closing the path through the portal on both sides along a path of conveyance.

FIG. 9 depicts a movable closure embodiment wherein a substantially cylindrical reading portal 82 has opposite openings that are covered and uncovered by a unitary structure comprising dual doors 86. The door structure can be manually movable or motorized. With a bin 26 carrying RFID tagged articles place inside the portal 83, the door structure is rotated such that doors 86 cover the opposite door openings. After reading the tags in bin 26, the door structure is rotated to open the opposite openings into the read zone and a next bin 26 is brought into position and the previously processed bin is removed. The next bin is then read and so-on. The operation of the doors can be coordinated with operation of the controller 72 shown in FIG. 7, namely so that reading is enabled or triggered when the doors are closed. In a motorized version, the read operation can continue until the controller has not detected an additional RFID tag for a predetermined time after polling for tags, e.g., a few seconds, whereupon the controller signals to open the doors. The particular time can be a user-selected option.

A portal structure characterized by partly or wholly curved shielding surfaces, especially a substantially cylindrical enclosure, has been found to be effective for multi-reading RFID tags. A cylindrical portal has been demonstrated to be capable of interacting with and reading quite a large number of RFID tags presented simultaneously (e.g., over a thousand) as attached to small tagged garments. In part, the effectiveness is due to confining the tagged articles inside a closed and shielded structure, where the power level applied to the reading zone can be set relatively high without bleeding signal strength or causing the emission of undue interference. RFID tags placed in the reading zone of such a portal are well exposed to direct propagation paths in both directions between the antennas and RFID tags. Additionally, propagation paths that include reflections vary widely in their orientation and endpoints, and tend to overcome issues associate with RFID tags that otherwise might shadow one another, or might reside in the null areas of standing waves.

In this context, the terms "curved" and "cylindrical" as applied to shielding surfaces should be construed to include curves that encompass all of a circumference or only a limited part of the circumference, the remainder of which might include flat surfaces. (See, for example, FIG. 8a, where a movable door is a flat part on a circular cylinder.) Embodiments disclosed herein as examples of cylinders are right circular cylinders with vertical axes but could be oriented in other directions including horizontal or oblique axes and cross sections that are not strictly circular but may instead be oval or made of polygonal flat faces. A shielding shape that has a polygonal shape in transverse cross section more and more nearly approximates a cylinder as the number of faces is increased. Each face (or each angle of incidence on a tangent to a smoothly curved shape presents a possible direction for reflection along a distinct propagation path.

Figure 10:
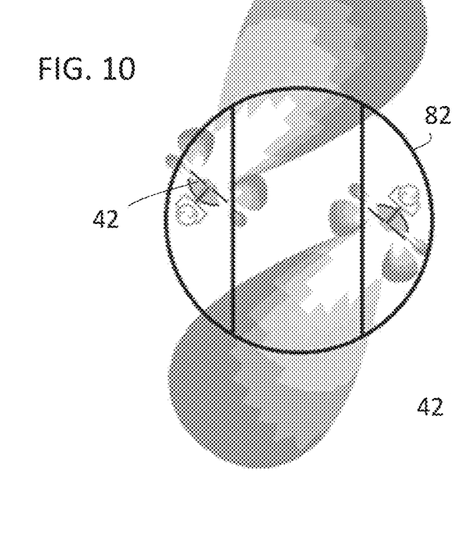
FIG. 10 is a schematic plan view showing an embodiment wherein beam axis of antennas for reading and/or writing is oriented at an inclined angle relative to a radius.

A cylindrical or substantially shielded portal structure has the advantage of supporting successive reflections of the polling signals from the antennas into the reading zone (i.e., the cylindrical space inside the reading portal), so as to enlarge the area exposed to the signal. In the embodiment of FIG. 10, antennas 42 are mounted on opposite walls and face inwardly into the enclosure 82 that encloses the reading zone. The illustration in FIG. 10 is a schematic plan view wherein the shapes protruding from the antennas 43 are graphical presentations of the relative power distribution of the antenna beam as a function of angle. It can be seen that the antennas re directional and emit their highest power along a beam axis subject to a divergence angle.

Figure 11:
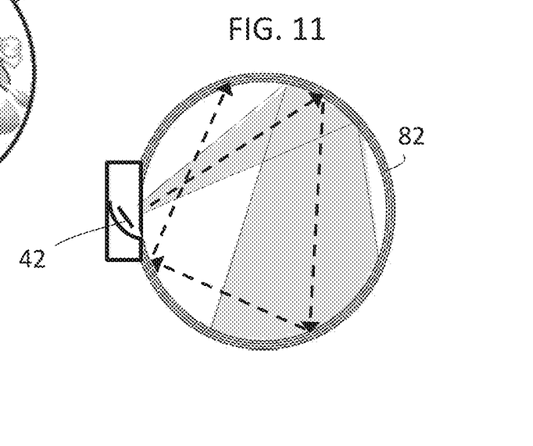
FIG. 11 is a schematic plan view showing a series of reflections considering an inclined beam center as in FIG. 10 notwithstanding beam divergence.
Figure 12:
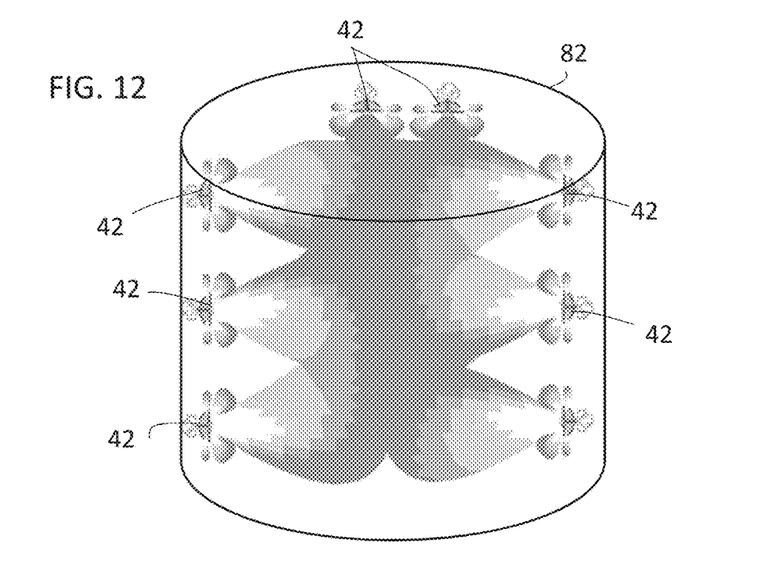
FIG. 12 is an schematic orthogonal view showing the concentration of beam energy in a midsection of the cylindrical portal

In the embodiment of FIG. 10, the two antennas on opposite walls of enclosure 82 are not directed directly towards to one another. Instead the antennas are directed obliquely (at an angle relative to a radius) and impinge on the shielded wall of the enclosure 82 at an acute angle relative to a tangent to the circular surface. As the beam is reflected from the enclosure wall, and continues to diverge, the area that is subject to the beam becomes larger, which is illustrated in FIG. 11 by an embodiment with just one obliquely directed antenna 42. Within a few reflections, the area of the reading zone is illuminated. It will be appreciated that the including two obliquely directed antennas and also by providing a stack of antennas at different heights as shown in FIG. 12 (including directed directly or obliquely relative to vertical a shown), the central part of the reading zone is well covered.

Commercial RFID tag reading systems are available that can concurrently interface with plural antennas, such reading systems and their components being available from Impinj, Laird, Tagsys and Motorola. The antennas can be oriented to complement one another while adapting to diverse RFID tag dipole orientations. For example, in the embodiment of FIG. 12, a plurality of antennas are provided. Around the circumference of the cylindrical portal 82, some antennas can be oriented to direct their beam centers radially and others obliquely to the radius on which the respective antenna is placed. Some antennas as shown are oriented vertically downward from above. With sufficient variation in paths and orientations, and with a high transmission power made possibly by enclosing the reading zones within shielding, RFID tag dipole antennas at any orientation are highly likely to be exposed to signaling and capable of responding notwithstanding the presence of many other RFID multi-read tags.

Where antennas are provided in pairs and oriented with beam centers in mutually orthogonal planes, the individual antennas can be linearly (plane) polarized and aimed orthogonally or circularly polarized. The point is to fill at least the center of the reading zone, where the RFID tags are disposed, with signals at sufficiently diverse angles of incidence and with sufficiently complex beam paths, that RFID tags (typically with dipole antennas) are very likely to respond to signaling regardless of the tag orientation and without structural elements or other RFID tags being positioned to shadow any one of the tags being read. In tests, it has been shown that it is possible to multi-read the RFID code values of thousands of RFID tags at the same time in this way.

The cylindrical enclosure 82 in FIGS. 8a-8c through 12 is advantageous for providing curved reflecting surfaces. The portal and shielded foyer enclosure 33 in FIGS. 1 and 2 is advantageous for providing shielding along a path leading into the read zone. Aspects of theses embodiments, including curved surfaces, shielded enclosures, inlet and/or outlet paths and stationary or movable closures, can be exploited together or separately and more or less vigorously in different embodiments of the invention. For example, the aspect of curved structures can be exploited more extensively using a spherical shielding enclosure with one or more shielded doors that define an area on a sphere and movably close over an access opening. The embodiments of FIGS. 1 and 2, where ingress is along a hallway/foyer shielding structure, are less continuously shielded.

Figures 13, 14:
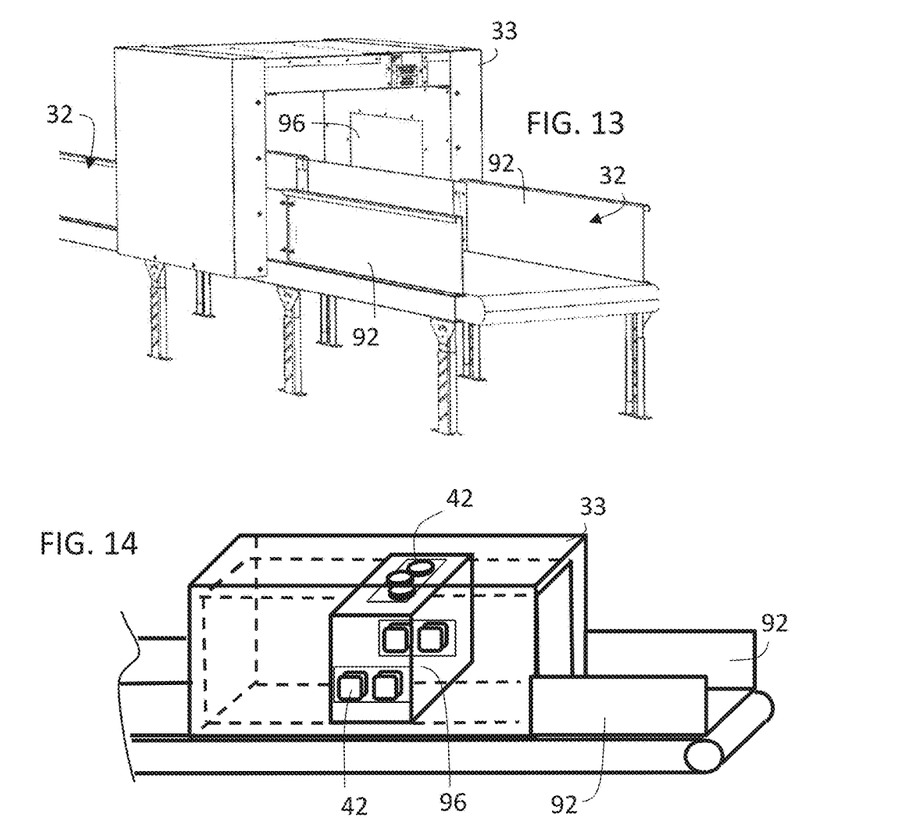
FIG. 13 is a perspective line drawing of an alternative embodiment in which the portal is arranged over a belt conveyor and is open at ends of the reading zone but for shielding skirts.
FIG. 14 is a partly phantom view according to FIG. 13, showing the disposition of the antennas at openings in the inward facing surfaces of an otherwise continuously shielded portal configuration defining a shielded skirted rectangular pathway.
Figure 15:
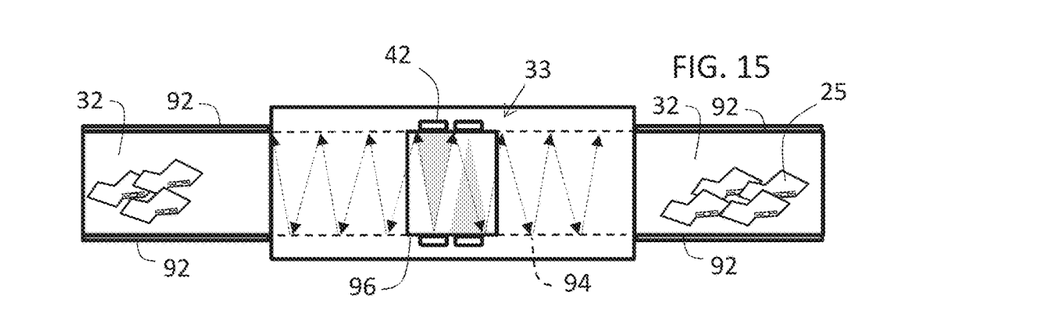
FIG. 15 is a schematic plan view, from above in FIG. 14.

A rectilinear structure is illustrated in FIGS. 13-15, forming a conveyor tunnel. The shielding of the ingress and egress passages 32 in this case is limited to lateral side fences 92 that extend upward from a belt conveyor on which the RFID tagged articles 25 are carried into and through the portal 33 where antennas 42 are directed at a reading zone. As in the other embodiments, the reading zone is a substantially enclosed and shielded zone within an enclosure or portal 33, comprising conductive walls 94, from which emissions of the antennas 42 are reflected. Thus the transponder signals to and from the antennas 42 are concentrated in the reading zone, and may be reflected several times back and forth along the walls 94 and potentially the lateral fences 92, in order to impinge on RFID articles that are not in the active reading zone. To facilitate discrimination of groups, the RFID tagged articles 25 that are grouped are spaced along the conveyor by a distance that is preferably as long as or longer than the section of the conveyor within the enclosure 33.

The conveyor tunnel embodiment shown in FIGS. 13-15 is open on the ends and may be operated at lower power than alternatives provided with additional shielding. Alternatively, additional shielding can be included. Conductive mesh curtains (not shown) may be included at the ends of openings of enclosure 33 or internally around the shielded internal structure defining the antenna mounting structure enclosing around the reading zone. The antennas 42 are set back from the conductive inner surface 94, and preferably are aimed through one or more window portions 96 made of a nonconductive material such as polycarbonate plastic, that are only large enough to pass transponder signals to and from the antennas 42. In this way the antennas are indented or set back and signal paths are both concentrated at the reading zone and isolated from direct paths to the outside through the ends of the portal enclosure 33.

The reflections from the internal surfaces 94 are maximized to concentrate signal energy and to isolate the active reading zone from interacting with or responding to RFID tagged articles that are outside. Articles 25 that are outside may be located on the floor rather than at the level of the reading portal and conveyor, which are spaced above the floor on legs so as to further isolate the read portal from the outside.

The subject matter being disclosed and illustrated in connection with embodiments presented as example, variations within the scope of the invention will become apparent to persons skilled in the art. The invention is not limited to the exemplary embodiments, and reference should be made instead to the subject matter defined in the following claims.

What is claimed is:

1. An apparatus for multi-reading RFID encoded articles in a group, comprising:
   an enclosure configured to receive a group of RFID encoded articles in a mass, and a plurality of interrogating and responsive antennas in the enclosure, arranged to provide an active reading area within the enclosure where interrogating and responsive signals are concentrated inwardly on the group of RFID encoded articles;
   wherein the enclosure includes electrically conductive material curved around the longitudinal axis at a radius, substantially defining a hollow right cylinder of conductive material;
   wherein the interrogating and responsive antennas include antennas directed inwardly from the conductive material at spaced positions along the longitudinal axis, oriented to define signal paths that are perpendicular to the longitudinal axis of the right cylinder at respective said spaced positions, wherein the signal paths are at an acute angle relative to a radius of the right cylinder at said respective spaced positions, whereby the signal paths of the antennas reflect internally around an inside of the right cylinder subject to multiple reflections from tangents to the right cylinder of conductive material.

2. The apparatus of claim 1, wherein the right cylinder includes at least one face of a polygonal surface such that a a transmission beam directed obliquely onto a point of intersection with the face is reflected obliquely from the face.

3. The apparatus of claim 1, wherein the enclosure comprises a vertically oriented right circular cylinder and further comprising at least one opening in a curved sidewall of the cylinder defining a path for the group of RFID encoded articles into the active reading area.

4. The apparatus of claim 3, wherein the path for the group of RFID encoded articles leads through opposite curved sidewalls of the cylinder and further comprising shielding doors that are curved to complement the sidewalls of the cylinder and are movable respective positions to cover the path for shielding the active reading area during reading and for uncovering the path to move the RFID encoded articles into and out of the active reading area.

* * * * *